US011008416B2

(12) United States Patent
Dörr et al.

(10) Patent No.: US 11,008,416 B2
(45) Date of Patent: May 18, 2021

(54) AQUEOUS, CURABLE COMPOSITION, COMPRISING DISPERSED URETDIONE PREPOLYMER, REACTANT AND AZOLATE

(71) Applicants: Covestro Deutschland AG, Leverkusen (DE); Covestro LLC, Pittsburgh, PA (US)

(72) Inventors: Sebastian Dörr, Düsseldorf (DE); Saskia Beuck, Cologne (DE); Hans-Josef Laas, Odenthal (DE); Dorota Greszta-Franz, Solingen (DE); Nusret Yuva, Burscheid (DE); Ralph-Georg Born, Remscheid (DE); Alan Ekin, Coraopolis, PA (US)

(73) Assignees: Covestro LLC, Pittsburgh, PA (US); Covestro Deutschland AG, Leverkusen (DE)

( * ) Notice: Subject to any disclaimer, the term of this patent is extended or adjusted under 35 U.S.C. 154(b) by 13 days.

(21) Appl. No.: 15/933,475

(22) Filed: Mar. 23, 2018

(65) Prior Publication Data
US 2019/0292299 A1  Sep. 26, 2019

(51) Int. Cl.
*C08G 18/20* (2006.01)
*C08G 18/09* (2006.01)
*C09D 175/06* (2006.01)
*C08G 18/42* (2006.01)
*B05D 3/02* (2006.01)
*C08G 18/24* (2006.01)
*C08G 18/75* (2006.01)
*B05D 1/28* (2006.01)
*C08G 18/48* (2006.01)
*C08G 18/12* (2006.01)

(52) U.S. Cl.
CPC ............ *C08G 18/097* (2013.01); *B05D 1/28* (2013.01); *B05D 3/0254* (2013.01); *C08G 18/12* (2013.01); *C08G 18/2018* (2013.01); *C08G 18/244* (2013.01); *C08G 18/4216* (2013.01); *C08G 18/4833* (2013.01); *C08G 18/755* (2013.01); *C09D 175/06* (2013.01)

(58) Field of Classification Search
CPC .... C09D 175/06; C08G 18/097; C08G 18/12; C08G 18/2036; C08G 18/755; C08G 18/4833; C08G 18/4216; C08G 18/244; C08G 18/798; C08G 18/2018
See application file for complete search history.

(56) References Cited

U.S. PATENT DOCUMENTS

| 3,169,945 | A | 2/1965 | Hostettler et al. |
| 7,098,289 | B2 | 8/2006 | Laas et al. |
| 9,080,074 | B2 | 7/2015 | Shaffer et al. |
| 2003/0013872 | A1* | 1/2003 | Laas .................... C08G 18/798 540/356 |
| 2007/0032594 | A1 | 2/2007 | Mazanek et al. |
| 2015/0329751 | A1 | 11/2015 | Stache et al. |

FOREIGN PATENT DOCUMENTS

JP      2004196836 A  *  7/2004

OTHER PUBLICATIONS

JP-2004196836_07-2004_English Translation.*
Ullmann's Encyclopadie der technischen Chemie [Ullmann's Encyclopaedia of Industrial Chemistry], 4th edition, vol. 19, Verlag Chemie, Weinheim, pp. 31-38.

* cited by examiner

*Primary Examiner* — Michael L Leonard
(74) *Attorney, Agent, or Firm* — John E. Mrozinski, Jr.

(57) ABSTRACT

The present invention relates to aqueous, curable composition, comprising or consisting of
A) at least one uretdione prepolymer, which comprises at least one uretdione group, and which is obtainable by reacting
  A1) at least one uretdione polyisocyanate having an isocyanate functionality of at least 2.0, whereby said uretdione polyisocyanate is obtained from at least one aliphatic polyisocyanate, with
  A2) at least one compound comprising at least one Zerewitinoff-active group, and
  A3) at least one reactant, which comprises at least one Zerewitinoff-active group and being different from A2 or which is $H_2O$,
  preferably in the presence of at least one catalyst, to obtain the uretdione prepolymer,
  wherein the prepolymer has an acid number of at most 4 mg KOH/g, preferably determined according to DIN EN ISO 2114:2002-06 as 37 wt. % aqueous dispersion; and
B) optionally at least one compound, which comprises at least one Zerewitinoff-active group; and
C) at least one azolate-compound. Furthermore, the present invention pertains to a process for curing the composition of the present invention on a substrate and a cured article obtained by this process. Moreover, the invention relates to the use of the compositions of the present invention for coatings, adhesives and/or sealants.

23 Claims, No Drawings

AQUEOUS, CURABLE COMPOSITION, COMPRISING DISPERSED URETDIONE PREPOLYMER, REACTANT AND AZOLATE

TECHNICAL FIELD

The invention relates to aqueous, curable compositions, which require low curing temperatures and can provide coatings on substrates upon curing. The invention also relates to a curing process of the aqueous, curable composition of the invention and the use of the compositions for coatings, adhesives and/or sealants.

BACKGROUND OF THE INVENTION

It is well known, that polyaddition compounds comprising uretdione groups function as crosslinkers for the preparation of polyurethane-based coatings. The crosslinking principle utilized in these crosslinkers is the thermal cleavage of the uretdione structures back into free isocyanate groups and the subsequent reaction thereof with a hydroxy-functional binder. A temperature of at least about 130° C. is required for said thermal cleavage.

Laas et al. (c.f. US 2004/0059082 A1) provided polyaddition compounds containing uretdione groups, obtainable by reacting uretdione polyisocyanates formed from diisocyanates having exclusively secondary- and/or tertiary-attached isocyanate groups with a molar fraction of isocyanurate structures, based on the sum of uretdione groups and isocyanurate groups, of not more than 10%, with compounds reactive towards isocyanates. Said uretdione polyisocyanates are prepared from diisocyanates, wherein the formation of the uretdione group is facilitated by oligomerization catalysts containing 1,2,3- or 1,2,4-triazolate structures in the anion. Curing of the powder coatings prepared from said polyaddition compounds of Laas et al. was also performed at high temperatures.

Mazanek et al. (c.f. US 2007/0032594) contributed self-crosslinking polyurethane dispersions, wherein said dispersed polyurethanes comprise uretdione groups Shaffer et al. (c.f. WO 2011/115669 A2) have successfully developed uretdione-based curing compositions capable of curing at low temperature of 20° C. to 70° C. The temperature was lowered by introducing an amine derived catalyst into the curing composition. It was found, that if the curing compositions of Shaffer were applied as solutions or dispersions in a solvent, the solvent used should be inert. Selected organic solvents were suggested by Shaffer et al. being appropriate solvents for said low temperature curing method.

It is known, that uretdione groups and isocyanate moieties are prone to hydrolysis.

It was an object of the present invention to provide an aqueous, curable composition, which cures faster and/or cures at low temperature. Coatings based on said aqueous, curable composition should have excellent mechanical and optical properties. The coatings should be resistant against solvents, especially against water. The coatings can be applied on different kind of substrates, for example on textiles, plastic, glass, metal, wood, etc. The curable composition of this invention can also function as a base composition for an adhesive. The resulting coatings are preferably transparent.

SUMMARY OF THE INVENTION

The present invention relates to aqueous, curable composition, comprising or consisting of A) at least one uretdione prepolymer, which comprises at least one uretdione group, and which is obtainable by reacting A1) at least one uretdione polyisocyanate having an isocyanate functionality of at least 2.0, whereby said uretdione polyisocyanate is obtained from at least one aliphatic polyisocyanate, with A2) at least one compound comprising at least one Zerewitinoff-active group, and A3) at least one reactant, which comprises at least one Zerewitinoff-active group and being different from A2 or which is $H_2O$, preferably in the presence of at least one catalyst, to obtain the uretdione prepolymer, wherein the prepolymer has an acid number of at most 4 mg KOH/g, preferably determined according to DIN EN ISO 2114:2002-06 as 37 wt. % aqueous dispersion; and B) optionally at least one compound, which comprises at least one Zerewitinoff-active group;

and

C) at least one azolate-compound. Furthermore, the present invention pertains to a process for curing the composition of the present invention on a substrate and a cured article obtained by this process. Moreover, the invention relates to the use of the compositions of the present invention for coatings, adhesives and/or sealants.

DETAILED DESCRIPTION OF THE INVENTION

For purposes of the following detailed description, it is to be understood that, other than in any operating examples, or where otherwise indicated, all numbers expressing, for example, quantities of ingredients used in the specification and claims the respective number includes "about" the respective number. For example if the number 10 is described "10" as well as "about 10" is included.

In the present invention, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In the present invention, a "monomer" is a low-molecular weight compound comprising functional moieties, wherein said monomer functions as a building block for polymers and has a defined molecular weight.

In the present invention the term "polymer" refers to a compound, formed during a chemical reaction by linking several monomers (i.e. more than two monomers) of the same or different kind together via covalent bonding, wherein the resulting polymer can differ in its degree of polymerization, molecular weight distribution and chain length respectively. Hence, a polymer according to the present invention is a compound, comprising in its molecular structure at least one repeating unit, which was integrated in the polymer structure during polymer synthesis by repeatedly linking monomers together via covalent bonds to form said polymer structure. The number average molecular weight is preferably at least 250 g/mol, more preferably at least 1,000 g/mol.

The term "polymer" includes homopolymers, copolymers, block-copolymers and oligomers.

In the present invention, a "prepolymer" is a polymer with reactive groups. In analogy to the definition of the term "polymer", the molecular structure of a prepolymer is formed by repeatedly linking more than two monomers of the same or different kind together. The prepolymer can participate in a subsequent formation of a polymer, which has a higher molecular weight than said prepolymer. The term "prepolymer" encompasses polymers, which are able to chemically react via at least one of its reactive groups, forming a repeating unit of a (preferably crosslinked) polymer. Therefore the term "prepolymer" encompasses as well self-crosslinking polymers with at least two different kinds of reactive groups, wherein said groups are able to chemically react among themselves, so that the prepolymer molecules are able to crosslink.

According to this invention, if not otherwise specified, the average molecular weight is defined as the number average molecular weight Mn. As molecular weight of polymers the number average molecular weight Mn is applied. Mn is determined via gel permeation chromatography (GPC at 23° C.) in tetrahydrofurane as the solvent. The measurement is performed as described in DIN 55672-1 (the DIN-version used was at the application date (or priority date if applicable) of the present invention, the latest version): "Gelpermeationschromatographie, Teil 1-Tetrahydrofuran als Elutionsmittel" (SECurity GPC-System from PSS Polymer Service, flowrate 1.0 ml/min; columns: 2×PSS SDV linear M, 8×300 mm, 5 μm; RID-detector). Probes of polystyrene of known molecular weight were used for calibration. The calculation of the number average molecular weight was performed by software. Baseline values and evaluation threshold values were determined according to above referenced DIN 55672 Teil 1.

The term "low-molecular" is defined to encompass a molecular weight up to 800 g/mol.

The term "high-molecular" is defined to encompass a molecular weight above 800 g/mol.

An "organic compound" contains at least one moiety, comprising a carbon-hydrogen covalent bond.

According to this application the term "aliphatic" is defined as non-aromatic hydrocarbyl groups being saturated or unsaturated.

According to this application the term "araliphatic" is defined as hydrocarbyl moieties composed of a non-aromatic, as well as saturated or unsaturated hydrocarbyl group, which is directly bonded to an aromatic moiety.

According to this application the term "alicyclic" or "cycloaliphatic" are optionally substituted, carbocyclic or heterocyclic compounds or moieties, which are non-aromatic (like for example cycloalkanes, cycloalkenes or oxa-, thia-, aza- or thiazacycloalkanes). Particular examples are cyclohexyl groups, cyclopentyl groups, and their N- or O-heterocyclic derivatives like for example pyrimidine, pyrazine, tetrahydropyrane or tetrahydrofurane.

In case the groups or compounds are disclosed to be "optionally substituted" or "substituted", suitable substituents are —F, —Cl, —I, —Br, —OH, —OCH$_3$, —OCH$_2$CH$_3$, —O-Isopropyl or —O-nPropyl, —OCF$_3$, —CF$_3$, —S—C$_{1-6}$-Alkyl and/or (optionally via a hetero atom attached) a linear or branched, aliphatic and/or alicyclic structural unit with 1 to 12 carbon atoms, respectively functioning as a substitute for a carbon bound hydrogen atom of the molecule in question. Preferred substituents are halogen (especially —F, —Cl), C$_{1-6}$-Alkoxy (especially methoxy and ethoxy), hydroxy, trifluoromethyl and trifluoromethoxy, respectively functioning as a substitute for a carbon bound hydrogen atom of the molecule in question.

In a formula illustrating the structure of a chemical moiety, a covalent bond of said formula marked with a * defines the covalent bond, which connects said illustrated moiety to the rest of a more complex molecular structure.

The term "transparent" preferably means that the coating (with a thickness of 45 μm) is capable of transmitting rays of visible light so bodies situated beyond or behind can be distinctly seen. Transparent coatings according to this invention exhibit a Haze-value<20 (Haze measurement instrument: DIN EN ISO 2813 (the DIN-version used at the application date (or at the priority date if applicable) of the present invention at the latest version).

The present invention in particular pertains to:
1. An aqueous, curable composition, comprising or consisting of
   A) at least one uretdione prepolymer, which comprises at least one uretdione group, and which is obtainable by reacting
      A1) at least one uretdione polyisocyanate having an isocyanate functionality of at least 2.0, whereby said uretdione polyisocyanate is obtained from at least one aliphatic polyisocyanate,
      with
      A2) at least one compound comprising at least one Zerewitinoff-active group,
      and
      A3) at least one reactant, which comprises at least one Zerewitinoff-active group and being different from A2 or which is H$_2$O,
      preferably in the presence of at least one catalyst, to obtain the uretdione prepolymer,
      wherein the prepolymer has an acid number of at most 4 mg KOH/g, preferably determined according to DIN EN ISO 2114:2002-06 as 37 wt. % aqueous dispersion; and
   B) optionally at least one compound, which comprises at least one Zerewitinoff-active group; and
   C) at least one azolate-compound.
2. The aqueous, curable composition according to aspect 1, characterized in that
   in a first step, the at least one uretdione polyisocyanate A1 is reacted, preferably in the presence of a catalyst, with the at least one compound A2 wherein after the first step the resulting intermediate product has preferably an isocyanate content of 0.5 to 10 wt.-%, preferably 1 to 6 wt.-%, more preferably 2 to 4 wt.-%, measured according to DIN EN ISO 11909:2007-05;
   and in a second step the polymer obtained in the first step is reacted with the at least one reactant A3.
3. The aqueous, curable composition according to aspect 1, characterized in that
   the components A1 to A3 are reacted in a one-step process, preferably in the presence of a catalyst.
4. The aqueous, curable composition according to aspect 1, characterized in that
   in a first step, the at least one uretdione polyisocyanate A1 is reacted with the at least one reactant A3 and in a second step the polymer obtained in the first step is reacted in a second step with the at least one compound A2, preferably in the presence of a catalyst.
5. The aqueous, curable composition according to any one of the above aspects, characterized in that said uretdione prepolymer is a nonionic prepolymer.
6. The aqueous, curable composition according to any one of the above aspects, characterized in that said uretdione prepolymer exhibits a zeta potential of at least −20 mV.

7. The aqueous, curable composition according to any one of the above aspects, characterized in that said uretdione prepolymer A comprises at least one *—O—(CH$_2$CH$_2$O)$_n$—R moiety, in which R is a hydrogen atom or a (C$_1$-C$_4$)-alkyl group and n is a number from 3 to 100.
8. The aqueous, curable composition according to any one of the above aspects, characterized in that said uretdione polyisocyanate A1 is obtained from at least one cycloaliphatic polyisocyanate.
9. The aqueous, curable composition according to any one of the above aspects, characterized in that said uretdione polyisocyanate A1 is obtained from isophorone diisocyanate (IPDI), 1,6-hexylene diisocyanate or mixtures thereof.
10. The aqueous, curable composition according to any one of the above aspects, characterized in that said uretdione polyisocyanate A1 is prepared from at least 20 mol % isophorone diisocyanate (IPDI) based on the total amount of polyisocyanates used.
11. The aqueous, curable composition according to any one of the above aspects, characterized in that said uretdione polyisocyanate A1 is prepared from isophorone diisocyanate as the only polyisocyanate used.
12. The aqueous, curable composition according to any one of the above aspects, characterized in that the uretdione polyisocyanate A1 contains from 1 to 10 uretdione moieties.
13. The aqueous, curable composition according to any one of the above aspects, characterized in that compound A2 is at least one polyol, preferably at least one polyalkoxy ether derivative comprising at least two —OH groups, which are present on two different non-neighbouring atoms of the molecule; and is more preferably selected from compounds of formula (I):

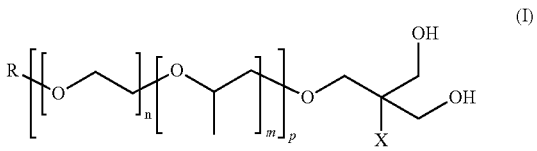

characterized in that
X is H or alkyl, preferably H or C$_{1-20}$-alkyl, more preferably H or C$_{2-10}$-alkyl;
R is a C$_{1-4}$ alkylene group;
p is an integer of 2 to 50;
in each unit p
n is independently 0 or 1 and
m is independently 0 or 1,
with the proviso that at least one of n or m in each unit p is 1
preferably characterized in that
X is H, methyl, ethyl, or propyl, preferably ethyl;
R is methyl;
p is an integer of 5 to 25;
in each unit p
n is independently 0 or 1 and
m is independently 0 or 1,
with the proviso that at least one of n or m in each unit p is 1 and the total amount of n≥m, preferably the total amount of n is at least 2*m, more preferably n is at least 3*m, most preferably only n is present.
14. The aqueous, curable composition according to any one of the above aspects, characterized in that compound A3 is selected from at least one polyol which is different from A2, preferably selected from polyester polyols, polyether polyols, polyurethane polyols, polyacrylate polyols, polymethacrylate polyols, polycarbonate polyols or mixtures thereof, preferably A3 is selected from polyester polyols, polyether polyols, polycarbonate polyols, polyurethane polyols, polyacrylate polyols, polymethacrylate polyols, C$_2$-C$_{10}$-hydrocarbons with at least two hydroxyl groups, or mixtures thereof, most preferably A3 is a polyester polyol.
15. The aqueous, curable composition according to any one of the above aspects, characterized in that said compound A1 is used in an amount of 3.0 to 50.0 wt. % based on the total weight of compounds A1 to A3.
16. The aqueous, curable composition according to any one of the above aspects, characterized in that said compound A2 is used in amount of 50 to 97 wt.-% based on the total weight of compounds A1 to A3.
17. The aqueous, curable composition according to any one of the above aspects, characterized in that the weight ratio of A1 to A2 is from 1:1 to 1:32.3.
18. The aqueous, curable composition according to any one of the above aspects, characterized in that said uretdione prepolymer is a dispersed uretdione prepolymer, preferably characterized in that the uretdione prepolymer is suspended in the aqueous liquid.
19. The aqueous, curable composition according to any one of the above aspects, characterized in that said uretdione prepolymer A is contained in a total amount of 3 to 40 wt. % based on the total weight of the composition.
20. The aqueous, curable composition according to any one of the above aspects, characterized in that said azolate-compound C is selected from at least one triazolate-compound of formula (III) or salts thereof and formula (IV) or salts thereof

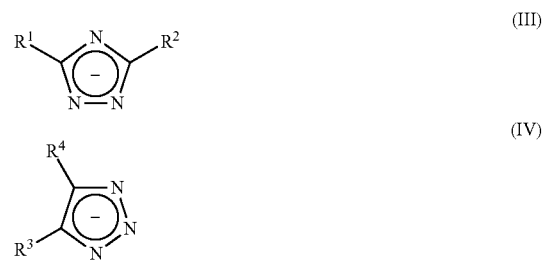

characterized in that
R$^1$, R$^2$, R$^3$ and R$^4$ are independently selected from a hydrogen atom, a halogen atom, a nitro group, a saturated or unsaturated, aliphatic or cycloaliphatic radical, an optionally substituted aromatic group comprising up to 20 carbon atoms and optionally up to 3 heteroatoms selected from oxygen, sulphur, nitrogen, an optionally substituted araliphatic group comprising up to 20 carbon atoms and optionally up to 3 heteroatoms selected from oxygen, sulphur, nitrogen,
and whereby R$^3$ and R$^4$ of formula (IV) together with the carbon atoms of the 1,2,3-triazolate five-membered ring form fused rings with 3 to 6 carbon atoms.
21. The aqueous, curable composition according to aspect 20, characterized in that said azolate-compound C is selected from alkaline metal-1,2,4-triazolate, alkaline metal-1,2,3-triazolate, alkaline metal-benzotriazolate, alkaline earth metal-1,2,4-triazolate, alkaline earth metal-1,2,3-triazolate, alkaline earth metal-benzotriazolate.

22. The aqueous, curable composition according to any one of the above aspects, characterized in that said at least one compound B, which comprises at least one Zerewitinoff-active group is selected from polyester polyols, polyether polyols, polyurethane polyols, polyacrylate polyols, polymethacrylate polyols, or polycarbonate polyols and mixtures thereof.
23. The aqueous, curable composition according to any one of the above aspects, characterized in that said uretdione prepolymer A is contained in an amount of 1 to 50 wt. % and
    said at least one compound B, which comprises at least one Zerewitinoff-active group is contained in an amount of 0 to 80 wt.-% and
    said triazolate-compound C is contained in an amount of 0.1 to 10 wt. %, based on the total weight of the composition, respectively.
24. The aqueous, curable composition according to any one of the above aspects, characterized in that the composition comprises water in an amount of 10 to 85 wt. %, based on the total weight of the composition.
25. The aqueous, curable composition according to any one of the above aspects, characterized in that the pH-value at 20° C. is from pH 5 to pH 13.
26. Process for curing a liquid composition on a substrate, comprising
    a) applying on a substrate an aqueous, curable composition according to any one of aspects 1 to 25; and
    b) exposing the deposited aqueous, curable composition to a temperature of 60° C. to 160° C. to cure said deposited curing composition.
27. Process according to aspect 26, wherein the deposited aqueous, curable composition is exposed to a temperature of 60° C. to 120° C. to cure said deposited curing composition.
28. Process according to aspect 26 or 27, wherein the deposited curable composition is exposed to said temperature for a period of 25 to 40 minutes to cure said deposited curing composition.
29. Process according to any one of aspects 26 to 28, wherein the deposited aqueous curable composition coalesces to form a coating.
30. Process according to any one of aspects 26 to 29, wherein the cured aqueous curable composition forms a solid on the substrate, preferably a transparent solid on the substrate.
31. A cured article obtainable by the process according to any one of aspects 26 to 30.
32. Use of the composition according to any one of aspects 1 to 25 for coatings, adhesives and/or sealants.

It was surprisingly found, that the above aqueous, curable compositions cure at low temperature, especially from 60° C. to 160° C., preferably from 60 to 120° C., most preferably 80 to 100° C.

Said aqueous, curable composition comprises less organic solvents compared to conventional curing compositions. According to the invention, water is used in the composition as a component (preferably as the main component) of the liquid continuous phase of the dispersion. Replacement of organic solvents, especially of low-VOC compounds, by water leads to more ecologically friendly compositions. Preferred compositions according to the invention are characterized in that they comprise water in an amount of 10 to 85 wt. %, particularly preferred in an amount of 30 to 75 wt. %, most preferred in an amount of 50 to 70 wt. %, also preferred in an amount from 40 to 70 wt. %, most preferred in an amount of 60 to 70 wt. %, based on the weight of the composition respectively.

The aqueous, curable compositions of the invention have a preferred pH-value (20° C.) of from pH 5 to pH 13, more preferred from pH 6 to pH 12, even more preferred from pH 7 to pH 9.

Said reactant B of the composition comprises on average at least one Zerewitinoff-active group and can be optionally present. Zerewitinoff-active groups are able to react with uretdione groups. It is also possible that the uretdione prepolymer A reacts with itself, i.e., forms a self-curable composition when B is absent.

Therefore, in one aspect the an aqueous, curable composition, comprises or consists of A) at least one uretdione prepolymer, which comprises at least one uretdione group, and which is obtainable by reacting
    A1) at least one uretdione polyisocyanate having an isocyanate functionality of at least 2.0, whereby said uretdione polyisocyanate is obtained from at least one aliphatic polyisocyanate,
    with
    A2) at least one compound comprising at least one Zerewitinoff-active group, and
    A3) at least one reactant, which comprises at least one Zerewitinoff-active group and being different from A2 or which is $H_2O$,
    preferably in the presence of at least one catalyst, to obtain the uretdione prepolymer,
    wherein the prepolymer has an acid number of at most 4 mg KOH/g, preferably determined according to DIN EN ISO 2114:2002-06 as 37 wt. % aqueous dispersion; and
C) at least one azolate-compound, preferably comprising at least one five-membered N-heterocycle, with the proviso, that
    (i) the five atoms forming the ring of said five-membered N-heterocycle comprise an amount of n nitrogen atoms with n=1, 2 or 3 and an amount of (5-n) carbon atoms,
    (ii) said five membered N-heterocycle comprises two endocyclic double bonds and a delocalized negative charge.

The least one uretdione prepolymer, comprising on average at least one uretdione group (and preferably at least one Zerewitinoff-active group), is preferably dispersed in said aqueous, liquid continuous phase. It is more preferred, when the dispersed uretdione prepolymer is suspended in the aqueous liquid.

In order to further improve the physiological compatibility, the composition of the invention is preferably substantially free of compounds comprising at least one isocyanate group. Due to the water present in the composition, the majority up to all isocyanate groups will hydrolyze. Preferably the content of the isocyanates groups (expressed as NCO, M.G. 42 g/mol) is below 0.05 wt.-%. Particularly preferred, the composition of the invention is free of compounds comprising at least one isocyanate moiety. Unless expressly mentioned otherwise, NCO contents were determined volumetrically in accordance with DIN-EN ISO 11909 (the DIN-version used at the application date (or at the priority date if applicable) of the present invention at the latest version).

In a preferred embodiment, the composition comprises said uretdione prepolymer in a total amount of 1 to 50 wt. %, preferably 3 to 40 wt. % and most preferred 30 to 40 wt. %, based on the weight of the composition.

The mean weight average molecular weight $M_w$ of the uretdione prepolymers (measured with GPC as described above, but with N,N-dimethylacetamide instead of tetrahydrofurane as solvent and calculated as $M_w$) is preferably in the range of 20,000 to 800,000 g/mol, particular preferred in the range of 100,000 to 500,000 g/mol.

The curing time is significantly reduced, if said uretdione prepolymer exhibits an acid number of at most 4 mg KOH/g, preferably at most 3.5 mg KOH/g, more preferably 3.0 mg KOH/g, most preferably at most 2.5 mg KOH/g (each determined according to DIN EN ISO 2114:2002-06), based on the total weight of the sample prepared to be used as initial compound to be tested in the determination according to DIN EN ISO 2114:2002-06. The unit of the acid number according to said DIN EN ISO 2114:2002-06 is the used amount of KOH in mg per g of said sample. The sample essentially consists (or consists) of 37 wt. % uretdione prepolymer and water.

The acid number of the respective uretdione prepolymer sample was always determined according to DIN EN ISO 2114:2002-06. Instead of a mixture of toluene and ethanol as described in DIN EN ISO 2114:2002-06, a mixture of acetone and ethanol in a weight ratio of 2:1 was used.

Related to the weight of the amount of uretdione prepolymer itself, the acid number according to this invention is preferably at most 10.8 mg KOH/g, more preferred at most 9.5 mg KOH/g, particularly preferred 8.1 mg KOH/g, most preferred at most 6.8 mg KOH/g. In these preferred embodiments, the unit of the acid number is the calculated used amount of KOH in mg per g of uretdione prepolymer. The determination is still performed by using above mentioned sample as initial compound for determination of the acid number (vide supra).

A preferred composition comprises at least one uretdione prepolymer, which exhibits a zeta potential of −20 mV or higher.

The zeta potential of the uretdione prepolymer is determined from a dispersion of uretdione prepolymer in water as the sample. One drop of a preformed dispersion of the uretdione prepolymer is highly diluted with 20 ml of demineralized water and homogenized by stirring, leading to the sample. Subsequently the zeta potential is determined at 23° C. in the Malvern Nanosizer ZS90 instrument (Malvern Instruments, Herrenberg, Germany). The given values of the zeta potential are always related to said sample of the dispersed uretdione polymer.

Preferably, said uretdione prepolymer is a nonionic prepolymer.

It was also found, that the curing time was improved by introducing hydrophilic groups as grafts or terminus into the structure of said uretdione prepolymer. For the reasons outlined before, it is again preferred, when said hydrophilic groups do not comprise an ionic moiety. A preferred uretdione prepolymer comprises grafts with at least one hydrophilic group selected from polyoxyalkylene ether capped with methyl, ethyl, propyl or butyl, polyethylene oxide capped with one methyl group, polyethylene oxide capped with one ethyl, propyl, or butyl group. Particularly preferred uretdione prepolymers comprise additionally on average at least one *—O—$(CH_2CH_2O)_n$—R moiety, in which R denotes a $(C_1-C_4)$-alkyl group and n denotes a number from 3 to 100, n denotes preferably a number from 5 to 70, more preferably from 7 to 55. R is preferably a methyl group.

Said hydrophilic groups can be introduced into the structure of said uretdione prepolymer by compound A2, which is preferably a hydrophylizing agent, more preferably a nonionic one. Suitable nonionically hydrophilizing agents are, for example, polyoxyalkylene ethers which have isocyanate-reactive groups, such as hydroxy, amino or thiol groups. Suitable examples are monohydroxy-functional polyalkylene oxide polyether alcohols having, on statistical average, 5 to 70, preferably 7 to 55, ethylene oxide units per molecule, as are accessible in a manner known per se by alkoxylation of suitable starter molecules (e.g. in Ullmanns Encyclopädie der technischen Chemie [Ullmanns encyclopaedia of industrial chemistry], 4th edition, Volume 19, Verlag Chemie, Weinheim pp. 31-38). These are either pure polyethylene oxide ethers or mixed polyalkylene oxide ethers, where they contain at least 30 mol %, preferably at least 40 mol %, ethylene oxide units, based on all of the alkylene oxide units present.

Particularly preferred nonionic hydrophilizing agents are monofunctional mixed polyalkylene oxide polyethers, which have 40 to 100 mol % ethylene oxide units and 0 to 60 mol % propylene oxide units.

Suitable starter molecules for such nonionic hydrophilizing agents are in particular saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis(2-ethylhexyl)amine, N-methyl- and N-ethylcyclohexylamine or dicyclohexylamine, and also heterocyclic secondary amines, such as morpholine, pyrrolidine, piperidine or 1H-pyrazole. Preferred starter molecules are saturated monoalcohols of the type specified above. Particular preference is given to using diethylene glycol monobutyl ether or n-butanol as starter molecules. Alkylene oxides suitable for the alkoxylation reaction are in particular ethylene oxide and propylene oxide, which can be used in the alkoxylation reaction in any desired order or else in a mixture.

Another preferred group of hydrophilization agents are polymers with two OH groups and a polyalkylene oxide side group, e.g. polyether-1,3-Diols. Commercially available examples are, Ymer™ N120 (CAS number: 131483-27-7) by Perstorp Holding AB, Malmo, Sweden and Tegomer® D 3403 (Evonik Industries AG, Essen, DE).

The uretdione prepolymers exhibit an acid number of at most 4 mg KOH/g (preferably at most 3.5 mg KOH/g, particularly preferred 3.0 mg KOH/g, most preferred 2.5 mg KOH/g) and comprising at least one uretdione group: additionally on average at least one Zerewitinoff-active group, particularly preferred at least two hydroxyl groups and at least one *—O—$(CH_2CH_2O)_n$—R moiety, in which R denotes a hydrogen atom or a $(C_1-C_4)$-alkyl group and n denotes a number from 3 to 100, n denotes preferably a number from 5 to 70, more preferably from 7 to 55. R is preferably a methyl group.

The uretdione prepolymer comprises at least one uretdione group. It is preferred, that the uretdione prepolymer comprises at least two uretdione groups. Preferred uretdione prepolymers of this invention are self-curing prepolymers. During heat induced curing, the uretdione prepolymer will (self-)crosslink via reaction of said uretdione groups with said Zerewitinoff-active groups. The more uretdione groups and Zerewitinoff-active groups are on average comprised in said uretdione prepolymer (or said reactant), the better.

A "Zerewitinoff-active group" is defined as a functional group, comprising at least one Zerewitinoff-active hydrogen atom, being an acidic hydrogen atom or active hydrogen atom.

The abundance of such an active hydrogen atom is determined by a known reaction of the compound in question with a Grignard reagent. The amount of Zerewitinoff-active hydrogen atoms is typically determined by measuring the amount of released methane gas, and subsequently calculated in consideration of the stoichiometry of the following reaction equation, wherein for each mole of active hydrogen atoms of the compound in question (R—XH) one mole of methyl magnesium bromide ($CH_3$—MgBr) is used and one mole of methane is released:

$$CH_3\text{—MgBr} + R\text{—XH} \rightarrow CH_4 + Mg(XR)Br$$

Zerewitinoff-active groups are in particular C—H active organic groups, —OH, —SH, —$NH_2$ or —NHR' wherein R' denotes an organic moiety. Preferably Zerewitinoff-active groups are selected from —OH, —SH, —$NH_2$ or —NHR' wherein R' denotes an organic moiety. Especially preferred, the Zerewitinoff-active groups according to the invention are selected from —OH. A particularly preferred uretdione prepolymer comprises as Zerewitinoff-active groups at least two hydroxyl groups.

The preparation of said uretdione prepolymer is typically achieved by reacting an uretdione polyisocyanate with at least one compound, comprising at least two Zerewitinoff-active groups using standard reaction techniques. It was found, that it was even possible to cure uretdione prepolymers at low temperature, which were prepared from at least one aliphatic uretdione polyisocyanate (especially cycloaliphatic uretdione polyisocyanate), preferably from at least 20 mol % aliphatic uretdione polyisocyanate based on the total amount of polyisocyanates used, particularly preferred only from aliphatic uretdione polyisocyanates.

The uretdione polyisocyanate A1 is used in an amount of 3 to 50 wt.-% based on the total amount of reactants used for preparation of said dispersed uretdione prepolymer.

The compound with at least one Zerewitinoff-active group A2 is preferably used in an amount of 50 to 97 wt.-% based on the total amount of reactants used for preparation of said dispersed uretdione prepolymer.

For preparation of said dispersed uretdione prepolymer it is particularly preferred to use the uretdione polyisocyanate A1 in relation to said compound A2 in a weight ratio from 1:1 to 1:32.3.

The uretdione polyisocyanates A1 are typically obtained by catalytic dimerization of polyisocyanates by methods, which are known in the art. Examples of suitable polyisocyanates include diisocyanates such as linear aliphatic polyisocyanates, cycloaliphatic polyisocyanates and alkaryl polyisocyanates. Specific examples include 1,4-diisocyanatobutane, 1,5-diisocyanatopentane (PDI), 1,6-diisocyanatohexane (also referred to as HDI or 1,6-hexylene diisocyanate), 2,4'- and 4,4'-diisocyanatodicyclohexylmethane (HMD1), isophorone diisocyanate (IPDI), 1,3- and 1,4-bisisocyanatomethylcyclohexane, 1,3- and 1,4-xylylene diisocyanates (XDI) and mixtures thereof.

Examples of dimerization catalysts are: trialkylphosphines, aminophosphines and aminopyridines such as dimethylaminopyridines, and tris(dimethylamino)phosphine, as well as any other dimerization catalyst known to those skilled in the art.

The result of the dimerization reaction depends, in a manner known to the skilled person, on the catalyst used, on the process conditions and on the polyisocyanates employed. In particular, it is possible for products to be formed, which contain on average more than one uretdione group per molecule, the number of uretdione groups being subject to a distribution. Preferred uretdione compounds are prepared from the catalytic dimerization of HDI and/or IPDI.

The uretdione polyisocyanate A1 preferably on average contains from 1 to 10 uretdione moieties.

Said uretdione polyisocyanate A1 is preferably prepared from isophorone diisocyanate (IPDI), 1,6-diisocyanatohexane (also referred to as HDI or 1,6-hexylene diisocyanate) or mixtures thereof.

Preferably said uretdione polyisocyanate A1 is prepared from at least one cycloaliphatic polyisocyanate. In another preferred embodiment, said uretdione polyisocyanate A1 is prepared from at least 20 mol % isophorone diisocyanate (IPDI) based on the total amount of polyisocyanates used. Said uretdione polyisocyanate A1 is most particularly preferred prepared from isophorone diisocyanate as the only polyisocyanate used.

Preferred uretdione polyisocyanates are for example commercially available as Desmodur N3400 from Covestro Deutschland AG, Leverkusen, Germany.

As mentioned before, the polyuretdione prepolymer is prepared from at least one uretdione polyisocyanate A1 with at least one compound A2.

It is particularly preferred to select compound A2 from at least one polyol. A preferred curable composition according to this invention comprises at least one uretdione prepolymer, which is prepared by the reaction of at least one uretdione polyisocyanate A1 as defined above with a compound A2 selected from at least one polyol.

The term "polyol" is meant to include materials having an average of two or more primary hydroxyl groups per molecule. The polyols useful in the practice can be either low or high molecular weight materials and in general will have average hydroxyl values as determined by ASTM designation E-222-67, Method B, between about 1000 and 2, and preferably between about 500 and 2. The polyols include low molecular weight diols, triols and higher alcohols and polymeric polyols such as polyester polyols, polyether polyols, polyurethane polyols and hydroxy-containing (meth) acrylic polymers.

Said at least one polyol as compound A2 is preferably selected from polyester polyol, polyether polyol, polyurethane polyol, polycarbonate polyol, polyacrylate polyol, polymethacrylate polyol, $C_2$-$C_{10}$-hydrocarbon with at least two hydroxyl groups, or mixtures thereof.

The low molecular weight diols, triols and higher alcohols useful in the instant invention are known in the art. For the most part they are monomeric and have hydroxy values of 200 and above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as cyclohexane dimethanol. Examples of triols and higher alcohols include trimethylol propane and pentaerythritol. Also useful are polyols containing either linkages such as diethylene glycol and triethylene glycol.

The most suitable polymeric polyols are those having hydroxyl values less than 200, such as 10 to 180. Examples of polymeric polyols include polyalkylene ether polyols, polyester polyols including hydroxyl-containing polycaprolactones, hydroxy-containing (meth)acrylic polymers, polycarbonate polyols and polyurethane polyols.

Examples of polyether polyols are poly(oxytetramethylene) glycols, poly(oxyethylene) glycols, poly(oxypropylene) glycols, and the reaction product of ethylene glycol with a mixture of propylene oxide and ethylene oxide.

Also useful are polyether polyols formed from the oxyalkylation of various polyols, for example, glycols such as ethylene glycol, 1,4-butane glycol, 1,6-hexanediol, and the like, or higher polyols, such as trimethylol propane, pentaerythritol and the like. One commonly utilized oxyalkylation method is reacting a polyol with an alkylene oxide, for example, ethylene oxide in the presence of an acidic or basic catalyst.

Polyester polyols can also be used as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols.

The diols which are usually employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality can also be utilized. Such higher polyols preferably include, for example, trimethylol propane, trimethylol ethane, pentaerythritol, and the like, as well as higher molecular weight polyols such as those produced by oxyalkylating low molecular weight polyols. A particularly preferred example of such high molecular weight polyol is the reaction product of 20 moles of ethylene oxide per mole of trimethylol propane.

The acid component of the polyester polyols consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutarate can be used.

Besides polyester polyols formed from polybasic acids and polyols, polycaprolactone-type polyesters can also be employed. These products are formed from the reaction of a cyclic lactone such as ε-caprolactone with a polyol with primary hydroxyls such as those mentioned above. Such products are described in U.S. Pat. No. 3,169,945 to Hostettler.

In addition to the polyether polyols and polyester polyols, hydroxy-containing (meth)acrylic polymers or (meth)acrylic polyols can be used as the polyol component.

Among the (meth)acrylic polymers are polymers of about 2 to 20 percent by weight primary hydroxy-containing vinyl monomers such as hydroxyalkyl acrylate and methacrylate having 2 to 6 carbon atoms in the alkyl group and 80 to 98 percent by weight of other ethylenically unsaturated copolymerizable materials such as alkyl (meth)acrylates; the percentages by weight being based on the total weight of the monomeric charge.

Examples of suitable hydroxy alkyl (meth)acrylates are hydroxyl ethyl and hydroxy butyl (meth)acrylate. Examples of suitable alkyl acrylates and (meth)acrylates are lauryl methacrylate, 2-ethylhexyl methacrylate and n-butyl acrylate.

Besides the acrylates and methacrylates, other copolymerizable monomers which can be copolymerized with the hydroxyalkyl (meth)acrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, α-methyl styrene, α-methyl chlorostyrene, vinyl butyrate, vinyl acetate, alkyl chloride, divinyl benzene, diallyl itaconate, triallyl cyanurate and mixtures thereof. Usually these other ethylenically unsaturated materials are used in admixture with the above-mentioned acrylates and methacrylates.

In a particularly preferred embodiment of the compound A2, said compound A2 is selected from polyester polyol, polyether polyol, polycarbonate polyol, polyurethane polyol, polyacrylate polyol, polymethacrylate polyol, $C_2$-$C_{10}$-hydrocarbon with at least two hydroxyl groups, or mixtures thereof, wherein said compound A2 comprises at least one *—O—$(CH_2CH_2O)_n$—R moiety, in which R denotes a ($C_1$-$C_4$)-alkyl group and n denotes a number from 3 to 100, n denotes preferably a number from 5 to 70, more preferably from 7 to 55. R is preferably a methyl group.

A further suitable compound A2 is selected from a compound of formula (I)

$$X\text{—}O\text{—}(CH_2CH_2O)_n\text{—}R \qquad (I)$$

wherein
X denotes a linear dihydroxy ($C_3$-$C_{10}$)-alkyl group, a branched dihydroxy ($C_3$-$C_{10}$)-alkyl group or a monohydroxy ($C_2$-$C_6$)-alkyl group,
R is a hydrogen atom or a ($C_1$-$C_4$)-alkyl group, and
n is a number from 3 to 100.

In formula (I) X denotes preferably a di(hydroxymethyl)-($C_1$-$C_8$)-alkyl group or a branched di(hydroxymethyl)-($C_1$-$C_8$)-alkyl group. Particular preferred X of formula (I) denotes a di(hydroxymethyl)-($C_1$-$C_8$)-alkyl group or a branched di(hydroxymethyl)-($C_1$-$C_8$)-alkyl group, with the proviso, that both hydroxymethyl groups bind to the same carbon atom respectively.

In formula (I) n denotes preferably a number from 5 to 70, more preferably from 7 to 55. In formula (I) R denotes preferably a methyl group.

In a particularly preferred embodiment of the invention said dispersed uretdione prepolymer is prepared from compound A2, which is a combination of at least one polyoxyalkylene ether, which have isocyanate-reactive groups, such as hydroxy, amino or thiol groups (preferably at least one compound of above mentioned formula (I)) and at least one polyol polymer. According to this embodiment said dispersed uretdione prepolymer it is again preferably prepared from a combination of A2-1) at least one compound of formula (I)

$$X\text{—}O\text{—}(CH_2CH_2O)_n\text{—}R \qquad (I)$$

wherein
X denotes a hydrogen atom, a linear dihydroxy ($C_3$-$C_{10}$)-alkyl group or a branched dihydroxy $(C_3-C_{10})$-alkyl group, R is a $(C_1-C_4)$-alkyl group, preferably methyl and n is a number from 3 to 100, preferably 8 to 30, and A3) at least one polyol, different from A2, selected from polyester polyol, polycarbonate polyol, polyurethane polyol, polyacrylate polyol, polymethacrylate polyol, or mixtures thereof.

Most preferably, compound A2-1 is used in a total amount of 1 to 25 wt.-%, preferably 5 to 20 wt.-% and compound A3 is used in a total amount of 20 to 70 wt.-%, preferably 35 to 65 wt.-%, based on the total amount of reactants used for preparation of said dispersed uretdione prepolymer.

Preferably, a fraction of the isocyanate groups of the uretdione polyisocyanate A1 are reacted first with compound A2-1, yielding an uretdione polyisocyanate with at least one *—O—$(CH_2CH_2O)_n$—R moiety and second the remaining isocyanate groups of the previous reaction product are reacted with compound A3, leading to the final uretdione prepolymer.

In preferred aspects compound A3 is water.

In another aspect of the invention reactant B is present and may be selected from at least one compound, which comprises on average at least one Zerewitinoff-active group. Preferably reactant B is selected from at least one polyol, particularly preferred from at least one polymeric polyol, most preferred from at least one of the preferred polymeric polyols as previously defined for A2 (vide supra).

Preferred compositions of the invention alternatively comprise at least one reactant B wherein said reactant is selected from polyester polyol, polyether polyol, polycarbonate polyol, polyurethane polyol, polyacrylate polyol, polymethacrylate polyol, $C_2$-$C_{10}$-hydrocarbon with at least two hydroxyl groups, or mixtures thereof.

The curable composition of this invention comprises as component C at least one azolate-compound. According to the Hantzsch-Widman-nomenclature (IUPAC-rule RB-1.2, R-2.3.3.1) an azole is the generic term for unsaturated five-membered heterocyclic compounds, comprising in the cycle one nitrogen atom and in addition to that optionally at least one or more further hetero atoms including nitrogen atom. An azolate-compound according to this invention includes the corresponding salts thereof as well (azolate).

Preferred azolate compound comprise a five-membered N-heterocycle. The ring of said preferred N-heterocycle contains an amount of n nitrogen atoms with n=1, 2 or 3 and an amount of (5-n) carbon atoms. In addition to that, the five membered ring of said N-heterocycle comprises two endocyclic double bonds. Said endocyclic double bonds are preferably conjugated double bonds. The five-membered N-heterocycle is negatively charged. Said negative charge is delocalized. Preferably the endocyclic double bonds contribute to the delocalization of the negative charge.

Preferred compositions comprise at least one azolate-compound of formula (II)

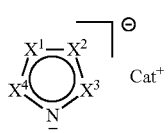

(II)

wherein one, two or three moieties of $X^1$, $X^2$, $X^3$ and $X^4$ independently of one another represent the moiety "—N═" wherein the rest of the moieties of $X^1$, $X^2$, $X^3$ and $X^4$ independently of one another represent "—CR═", wherein R independently represents H, $C_1$ to $C_{20}$ alkyl, $C_3$ to $C_{20}$ cycloalkyl $C_6$ to $C_{20}$ aryl, $C_1$ to $C_2$ alkoxy, —$NR'_2$ (R'=$C_1$ to $C_{20}$ alkyl), —$NO_2$, fluorine, chlorine, bromine, fluorinated $C_1$-$C_6$-alkyl, fluorinated $C_1$-$C_6$-alkoxy, cyano, carboalkoxy, —S—R" (R"=$C_1$ to $C_{20}$ alkyl), and/or —S—($C_6$ to $C_{20}$ aryl) and in the event two adjacent substitutents of $X^1$ to $X^4$ represent "—CR═", the substituents R of these substituents together with the C-atoms of these substituents may form a further annellated carbo- or heterocyclic, n-membered ring system where n=3 to 10, wherein the annellated carbo- or heterocyclic ring system may, independently of one another, contain one or more heteroatoms (N, O, S) and may be substituted independently of one another by one or more the same or different substituents from the following group: H, $C_1$ to $C_{20}$ alkyl, $C_3$ to $C_{20}$ cycloalkyl $C_6$ to $C_{20}$ aryl, $C_1$ to $C_2$ alkoxy, —$NR'_2$ (R'=$C_6$ to $C_{20}$ alkyl), —$NO_2$, fluorine, chlorine, bromine, fluorinated $C_1$-$C_6$-alkyl, fluorinated $C_1$-$C_6$-alkoxy, cyano, carboalkoxy, —S—R" (R"=$C_1$ to $C_{20}$ alkyl), and/or —S—($C_6$ to $C_{20}$ aryl), Cat$^+$ is a counterion.

The cycle of formula (II) represents a π-system, comprising the two endocyclic double bonds and the delocalized charge.

The azolate compounds are usually prepared by deprotonation of a neutral azole compound. Deprotonation is achieved preferably with a base, preferably with alkaline alkoxides like sodium methanolate, alkaline earth alkoxides, alkaline hydroxides or alkaline earth hydroxides. The azolate compound of formula (II) is prepared by deprotonization of neutral compounds of formula (II-1) with a base, preferably with at least one of the above mentioned preferred bases,

(II-1)

wherein $X^1$, $X^2$, $X^3$ and $X^4$ are defined according to formula (II).

Other suitable neutral compounds for preparation of the azolate compound according to the invention include pyrrole, substituted pyrroles and carbocyclic and/or heterocyclic annellated derivatives of pyrrole.

Other suitable neutral compounds for preparation of the azolate compound according to the invention include pyrazole and/or imidazole, substituted pyrazoles and/or imidazoles and carbocyclically and/or heterocyclically annellated derivatives of pyrazole and/or imidazole.

Other suitable neutral compounds for preparation of the azolate compound according to the invention include triazole, preferably selected from 1,2,3- and 1,2,4-triazoles, substituted species of 1,2,3- and 1,2,4-triazoles and carbocyclically and/or heterocyclically annellated species of 1,2,3- and 1,2,4-triazoles.

To produce the azolate compound, in principle all five-membered N-heterocycles may be used which carry at least one hydrogen atom bound to a ring nitrogen atom. Examples of these include pyrrole, indole, carbazole and substituted derivatives such as 5-nitroindole or 5-methoxyindole, pyrazole, indazole and substituted derivatives such as 5-nitroindazole, imidazole and substituted derivatives such as 4-nitroimidazole or 4-methoxyimidazole, benzimidazole or substituted benzimidazoles, for example 5-nitrobenzimidazole, 5-methoxybenzimidazole, 2-trifluoromethylbenzimidazole, hetero-aromatic annellated imidazoles such as pyridinoimidazole or purine, 1,2,3-triazole and substituted derivatives such as 4-chloro-5-carbomethoxy-1,2,3-triazole or 4-chloro-5-cyano-1,2,3-triazole, 1,2,4-triazole and substituted derivatives such as 3,5-dibromotriazole, 1,2,3-benzotriazole and substituted 1,2,3-benzotriazole such as 5-fluor-1,2,3-benzotriazole, 5-trifluoromethyl-1,2,3-benzotriazole, 5-nitro-1,2,3-benzotriazole, 5-methoxy-1,2,3,-benzotriazole, 5-chloro-1,2,3-benzotriazole, 5-tetrafluoroethoxy-1,2,3-benzotriazole, 5-trifluorothio-1,2,3-benzotriazole, 4,6-bis-(trifluoromethyl)-1,2,3-benzotriaole, 4-trifluoromethoxy-5-chloro-1,2,3-benzotriazole and heteroaromatic annulated 1,2,3-triazoles such as the isomeric pyridinotriazoles, for example the 1H-1,2,3-triazolo[4,5-b]pyridine—referred to in the remainder of the text as pyridinotriazole- and azapurine.

In particularly preferred compositions of the invention, the composition comprises at least one triazolate-compound as component C).

Said triazolate-compound is most preferably selected from at least one triazolate-compound of the group comprised of formula (III) and formula (IV)

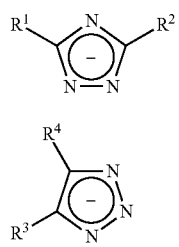

wherein
$R^1$, $R^2$, $R^3$ and $R^4$ independent from one another denote a hydrogen atom, a halogen atom, a nitro group, a saturated or unsaturated, aliphatic or cycloaliphatic radical, an optionally substituted aromatic group comprising up to 20 carbon atoms and optionally up to 3 heteroatoms selected from oxygen, sulphur, nitrogen, an optionally substituted araliphatic group comprising up to 20 carbon atoms and optionally up to 3 heteroatoms selected from oxygen, sulphur, nitrogen, and where $R^3$ and $R^4$ of formula (IV) together with the carbon atoms of the 1,2,3-triazolate five-membered ring form fused rings with 3 to 6 carbon atoms.

Said triazolate-compound is particularly preferred selected from alkaline metal-1,2,4-triazolate, alkaline metal-1,2,3-triazolate, alkaline metal-benzotriazolate, alkaline earth metal-1,2,4-triazolate, alkaline earth metal-1,2,3-triazolate, alkaline earth metal-benzotriazolate. Especially preferred, the triazolate-compound is selected from alkaline metal-1,2,4-triazolate, alkaline metal-1,2,3-triazolate, alkaline metal-benzotriazolate. Sodium 1,2,4-triazolate, potassium 1,2,4-triazolate, sodium 1,2,3-triazolate, potassium 1,2,3-triazolate, sodium benzotriazolate, potassium benzotriazolate and mixtures thereof are the most preferred triazolate-compounds.

It was proven advantageous to preferably apply curable compositions, which comprise said azolate-compound, preferably said triazolate-compound, in an amount of 0.1 to 10.0 wt. %, particularly preferred of 0.3 to 3 wt. %, based on the weight of the composition respectively. Particularly preferred curable compositions of the invention comprise said dispersed uretdione prepolymer in an amount of 1 to 50 wt. %, preferably 3 to 40 wt. % and most preferred 30 to 40 wt. % and said azolate-compound, preferably said triazolate-compound, in an amount of 0.1 to 10.0 wt. %, preferably 0.3 to 3 wt.-%, based on the weight of the composition respectively.

In addition to the ingredients mentioned the composition above may contain various optional ingredients. Examples of these are dyes, pigments, fillers and reinforcing agents, for example calcium carbonate, silicates, talc, kaolin, mica and barium sulfate. Other additives, for example plasticizers, lubricants and rheological additives and solvent or diluent may be included in the compositions. When present, these optional ingredients may constitute up to 50% by weight of the composition based on the total weight of the composition.

Of particular interest is the use of the compositions of the invention for preparing coatings on substrates of all kinds. Such coatings are preferably protective and decorative coatings such as exterior coatings on substrates of all kinds, for example buildings, fences, chipboard panels, and as a coating on stone, concrete or metal, for the coating of vehicles, for example, such as cars, railways or aircraft. The compositions may likewise be used in automotive OEM finishing and automotive refinish, and also for the finishing of car bodies, plastic parts for cars and body-mounted car parts.

The compositions of the invention can also be used as sealants or adhesives.

Another object of the present invention is a Process for curing a liquid composition on a substrate, comprising
a) applying on a substrate an aqueous, curable composition according to the present invention; and
b) exposing the deposited aqueous, curable composition to a temperature of 60° C. to 160° C. to cure said deposited curing composition.

Using known coating processes, the aqueous, curable composition may be applied uniformly to a substrate, for example by spin coating, dip coating, knife coating, curtain coating, brushing, spraying—especially electrostatic spraying—and reverse roll coating. Said coating compositions can be used as a primer, color coat or as a clearcoat.

The previously described preferred embodiments of said aqueous, curable composition are of course also preferably used in the process of this invention.

In a special embodiment of the process, prior to step a), the aqueous, curable composition of step a) is prepared from an aqueous, curable concentrate, comprising
i) 25 to 50 wt.-%, preferably 32 to 45 wt.-%, of at least one uretdione prepolymer A,
and
ii) 0.1 to 10 wt.-%, preferably 0.3 to 5 wt.-%, of at least one azolate-compound C,
by diluting said concentrate with a diluent, yielding the aqueous, curable composition used in step a)
comprising, related to the weight of said aqueous, curable composition of step a)
i) 12.5 to 42.2 wt.-%, preferably 27 to 38 wt.-%, of at least one uretdione prepolymer A,
and
ii) 0.05 to 8.5 wt.-%, preferably 0.25 to 3 wt.-%, of at least one azolate-compound.

The choice of diluent and the concentration depend predominantly on the choice of coating ingredients and the coating process. The diluent should be inert. In other words, it should not undergo any chemical reaction with the components and should be capable of being removed after the coating operation in the curing process. Surprisingly it was found, that especially water is an appropriate diluent. Examples of suitable diluents are water, ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate. It is particularly preferred to use water as the most abundant diluent.

It is particularly preferred, that the deposited aqueous curable composition coalesces to form a coating. The coating thickness upon drying is typically from 0.5 to 46 µm. If the coating is a base coat, the coating thickness upon drying is preferably 15 to 20 µm. If the coating is a top coat, the coating thickness upon drying is preferably 45 to 50 µm.

The deposited aqueous, curable composition is preferably exposed to a temperature of 60 to 120° C., preferably 80 to 100° C., to cure said deposited curing composition.

According to the process of the invention, the deposited aqueous, curable composition is preferably exposed to said temperature for a period of 20 to 45 minutes to cure said deposited curing composition. It is particularly preferred to expose the deposited aqueous, curable composition to a temperature of 60 to 120° C., preferably 80 to 100° C., for a period of 20 to 45 minutes.

It is also preferred to cure said deposited, aqueous curable composition by preheating the deposited, curable composition to a temperature of 30° C. to below 60° C. for a period of 2 to 10 minutes. Said preheating is particularly preferred followed by increasing the temperature to 60 to 160° C. (preferably to 60 to 120° C., most preferred to 80 to 100° C.) and exposing for another period of 20 to 45 minutes at said increased temperature. The preheating step is advantageous, since the amount of water is reduced in the deposited, curable composition prior to curing. The subsequent curing reaction at 60° C. to 160° C. is thereby enhanced.

Preferably, the cured aqueous curable composition forms a crosslinked film on the substrate that shows excellent mechanical and optical properties and a high resistance against chemicals and solvents.

EXAMPLES

The present invention is illustrated by reference to examples, although these are not to be understood as being limiting. Unless stated otherwise, all of the quantitative data, fractions and percentages are based on the weight and the total amount relates the total weight of the compositions.

1. Methods and Materials:

All percentages refer, unless stated otherwise, to the weight.

1.1 Pendulum Hardness:

The pendulum hardness by the König method was measured on a glass plate according to DIN EN ISO 1522:2007-04.

1.2 Solvent Resistance and Water Resistance:

The cured coating were tested for resistance to xylene, 1-methoxy-2-propyl acetate, ethyl acetate, acetone and water. A piece of cotton wool soaked in the test substance was placed on the coating surface and covered with a watch glass. After the indicated exposure time, the cotton was removed, the exposed area was dried and examined immediately. The evaluation of the softening or discoloration of the coating surface was carried out according to DIN EN ISO 4628-1: 2016-07.

0 unchanged, i.e., no discernible change
1 very light, i.e., only visible change, e.g., slight color change
2 identifiable, i.e., clearly recognizable change, e.g., noticeable softening when scratching with the fingernail
3 clearly noticeable change, e.g., medium color change, possibly small blistering
4 strong change, e.g., strong blistering
Coating completely destroyed without an external influence 1.3 Infrared Measurements:

The uretdione ring opening was characterized by an FT-IR spectrometer (tensor II with Platinum ATR unit (diamond crystal) from Bruker). The spectra were recorded in a wave number range of (4000-400) cm$^{-1}$. The maximum of the uretdione peak (about 1760 cm$^{-1}$) was evaluated. Peak heights to comparative systems were compared with an initial value set to 100% (uretdione film without catalyst, dried at room temperature) and variations relative to this (ratio formation). Uretdione peak height of films cured for 30 min at 180° C. were set to 0%.

When measuring on an ATR crystal, the intensity of the spectrum depends on the occupation of the crystal surface. Since a comparable coverage of the crystal surface cannot be ensured in the case of different measurements by the sample preparation, a correction of this effect must be made for the ratio formation by normalizing all spectra on the peak of the CH stretching vibration (wave number range (3000-2800 cm$^{-1}$). In the case of the evaluation of peak heights as described above, a baseline correction of the spectra is additionally carried out.

1.4 Oscillation Measurement:

Rheometer: Rheometrics ARES. The measurements are made with the exclusion of oxygen (convection oven with nitrogen). The sample preparation takes place in Teflon-Petry dishes. From the dried films (24 h room temperature in air) circular samples with a 14 mm diameter are punched out. The theometer oven is previously heated to the measurement temperature (e.g. 160° C.). A few seconds before the measurement, the furnace is opened, the cut-out sample inserted between the 14 mm diameter circular measuring plates, the furnace closed and the measuring plates collapsed until the sample height fills the measuring gap and a clear increase in the normal force was observed. Directly thereafter, the time measurement is started and the storage module G' is determined as a function of the measurement time at a constant sample temperature. Measuring frequency: 1 Hz.

1.5 Catalysts:

Non-Inventive Reference Systems
Lupragen N 700 (Cat 1) (or DBU or 1,8-Diazabicyclo-5,4,0-undecene-7) was purchased from BASF SE, Ludwigshafen, Germany.
Polycat SA2LE (Cat 2) (blocked DBU) was purchased from Air Products GmbH, Hattingen, Germany (now Evonik).
Inventive
Triazolate-catalysts were purchased from Sigma-Aldrich Chemie GmbH, Munich, Germany. If a triazole (amine form) was purchased, the triazolate catalyst was prepared as follows: 1 mol of catalyst (amine form) was slurried in water (10%), followed by the addition of 1 mol of NaOH (solid) or KOH, LiOH, RbOH, CsOH and stirring until a clear liquid was formed.

The triazolate catalyst solutions used had the following specifications:
Solutions in Water.
Na-1,2,3-Triazolate: solid content: 24.0%, pH: 11.5
Na-1,2,4-Triazolate: solid content: 12.4%, pH: 12.3
Na-Benztriazolate: solid content: 20.5%, pH: 10.9
Li-1,2,4-Triazolate: solid content: 9.9%, pH: 11.7
K-1,2,4-Triazolate: solid content: 26.0%, pH: 11.7
Cs-1,2,4-Triazolate: solid content: 43.6%, pH: 13.9
Rb-1,2,4-Triazolate: solid content: 1.5% pH: 11.3
2.0 Polymer Synthesis Examples:

Unless noted otherwise, all of the analytical measurements refer to measurements at temperatures of 23° C.

The solids contents (non-volatile contents) were determined by heating a weighed sample at 125° C. to constant weight. At constant weight, the solid content is calculated by reweighing the sample.

NCO contents were determined volumetrically in accordance with DIN-EN ISO 11909:2007-05. The control on free NCO groups was carried out by means of IR spectroscopy (band at 2260 cm$^{-1}$)

The stated viscosities were determined by means of rotary viscometry in accordance with DIN 53019 at 23° C. using a rotary viscometer with a shear rate of 40 1/s, from Anton Paar Germany GmbH, Ostfildern, Germany.

The average particle sizes (number-average) of the polyurethane dispersions were determined following dilution with deionized water by means of laser correlation spectroscopy (instrument: Malvern Zetasizer 1000, Malver Inst. Limited, London, UK).

Zeta potential was measured by diluting one drop of the sample with 20 ml demineralized water and homogenized by stirring. Subsequently the zeta potential is determined at 23° C. in the Malvern Nanosizer ZS90 "(Malvern Instruments, Herrenberg, Germany).

Acid number of the respective dispersion was determined according to DIN EN ISO 2114:2002-06. Instead of a mixture of toluene and ethanol—as described in DIN EN ISO 2114:2002-06—a mixture of acetone and ethanol (2:1 by weight) was used as solvent. The unit of the acid number is mg KOH per g of the analyzed sample.
Ymer N120 (CAS number: 131483-27-7, a linear, trimethylolpropane started polyethylene glycol monomethyl ether, OH number 100-120 mg KOH/g) was acquired from Perstorp Holding AB, Malmo, Sweden
polyester 1 OH-functional polyester prepared from 3039 g adipic acid, 4041 g isopthalic acid, 267 g 1,2-propylene glycol, 4773 g neopentyl glycol and 1419 g trimethylol propane (OH number: 181 mg KOH/g, acid number<3 mg KOH/g)

Other chemicals were—unless otherwise stated—purchased at Sigma-Aldrich Chemie GmbH, Munich, Germany
2.1 Preparation of Uretdione Prepolymer Dispersion a (According to Invention)

To 1000 g (4.50 mol) of isophorone diisocyanate (IPDI) were added at room temperature under dry nitrogen and stirring 10 g (1%) of triisodecyl phosphite and 20 g (2%) of 4-dimethylaminopyridine (DMAP) as catalyst. After 20 h, the reaction mixture, which had an NCO content of 28.7%, corresponding to a degree of oligomerization of 21.8%, was freed from volatile components without prior addition of a catalyst poison with the aid of a thin-film evaporator at a temperature of 160° C. and a pressure of 0.3 mbar.

This gave a pale yellow uretdione with a content of free NCO groups of 17.0%, a content of monomeric IPDI of 0.4% and a viscosity (according to DIN EN ISO 3219: 1994-10) of more than 200,000 mPas (23° C.).

149.0 g of this obtained IPDI uretdione were dissolved in 580 g acetone at 50° C. in a standard stirring apparatus. 64.6 g of Ymer N120 and 0.53 g of tin neodecanoate were added and the mixture was stirred at reflux under atmospheric pressure until the NCO content of 2.5% was reached. Then 213.20 g of polyester 1 were added and the mixture was stirred under reflux at atmospheric pressure until the NCO content dropped below 0.5%. The mixture was then dispersed by adding 213.2 g of water. The solvent was removed by distillation in vacuum; the solid content was adjusted by addition of water.

The resulting white dispersion had the following properties:

Solids content: 37%

Average particle size (LCS): 107 nm

Viscosity (viscometer, 23° C.): 118 mPas pH (23° C.): 5.3

Acid number: 0.9 mg KOH/g

Zeta potential: −16.4 mV 3.0 Tests of the Coating:

Clear coatings were prepared from the following composition:

100 weight percent (20 g) of urethane prepolymer dispersion A (or comparative) was mixed with the catalyst, respectively the catalyst solution:

- 6 weight percent (1.2 g) of a solution consisting of 0.12 g Cat 1: (DBU): and 1.08 g water,
- 3 weight percent (0.6 g) of a solution of 0.12 g Cat 2 (Polycat SA2LE) and 0.48 g water,
- 5 weight percent (1.0 g) of a solution consisting of 0.1 g 1,2,4-Triazol-Li and 1.1 g water,
- 6 weight percent (1.2 g) of a solution consisting of 0.12 g 1,2,4-Triazolate-Na and 1.08 g water,
- 2.5 weight percent (0.5 g) of a solution consisting of 0.12 g 1,2,3-Triazolate-Na and 0.38 g water,
- 2.7 weight percent (0.54 g) of a solution consisting of 0.12 g 1,2,3-Triazolate-K and 0.42 g water,
- 2.4 weight percent (0.48 g) of a solution consisting of 0.12 g 1,2,3-Triazolate-Rb and 0.36 g water,
- 2.3 weight percent (0.46 g) of a solution consisting of 0.12 g 1,2,3-Triazolate-Cs and 0.34 g water,
- 4.5 weight percent (0.91 g) of a solution of 0.12 g Benzotriazol-Na and 0.79 g water.

The mixture was applied to glass or coil using a doctor's blade with a layer thickness of 150-180 μm (wet). The plates were dried at room temperature for 5 minutes and then baked at various temperatures for 30 minutes. The obtained films were evaluated at 23° C. at 50% relative humidity in terms of pendulum hardness, water resistance and solvent resistance and an IR spectrum was recorded. When possible, an oscillation measurement was carried out as well.

The following table shows the coating properties of the corresponding films:

TABLE 1

Results of IR-Study, hardness and resistance determinations
The curing reaction can be monitored by observation of the ring opening of the uretdione. With triazolate compounds in comparison to other catalysts, uretdione peak almost vanishes. Also pendulum hardness increases with the effectiveness of catalyst. The required resistance to xylene should be to be at least 2-3, resistance against water shall be at least 1. Both resistances can only be obtained with triazolate catalysts.

| | | Without cat. (Comp. Ex.) | Cat 1 (Comp. Ex.) | Cat 2 (Comp. Ex.) | 1,2,4 Triazolate-Li | 1,2,4-Triazolate-Na | 1,2,3-Triazolate-Na | 1,2,4-Triazolate-K | 1,2,4-Triazolate-Rb | 1,2,4-Triazolate-Cs | Benztriazolate-Na |
|---|---|---|---|---|---|---|---|---|---|---|---|
| Curing | Time °C. | 30 min 100° C. | 30 min 100° C. | 30 min 100° C. | 30 min 100° C. | 30 min 100° C. | 30 min 100° C. | 30 min 100° C. | 30 min 100° C. | 30 min 100° C. | 30 min 100° C. |
| Remaining intensity of IR-peak with peakmax b/w 1750 und 1800 cm$^{-1}$ in % | | >97 | 36 | >97 | <3 | <3 | <3 | <3 | <3 | <3 | <3 |
| Pendulum hardness, Koenig on glass | Sec. | 40 | 100 | 35 | 130 | 130 | 150 | 150 | 140 | 140 | 150 |
| Resistance against xylene On glas | For 5 min | 0-5 | 5 | 4-5 | 5 | 2-3 | 2-3 | 1-2 | 1-2 | 1-2 | 2-3 |
| Resistance against water On coil | For 1 h | 0-5 | 4 | 1-2 | 3 | 0-1 | 0-1 | 0-1 | 0-1 | 0-1 | 0-1 |
| Oscillation measurement: 30 min t-sweep, G' at 1 Hz | Pascal | — | — | — | — | $7 \ast 10^4$ | — | $1.3 \ast 10^5$ | $1.1 \ast 10^5$ | $1.5 \ast 10^5$ | — |

Comp. Ex. = Comparative Example

TABLE 2

| | | IR Study | | | | | |
|---|---|---|---|---|---|---|---|
| | curing | Without catalyst | 1,2,4-Li-Triazolate | 1,2,4-Na-Triazolate | 1,2,4-K-Triazolate | 1,2,4-Rb-Triazolate | 1,2,4-Cs-Triazolate |
| Remaining intensity of IR-peak with peak max b/w 1750 und 1800 cm$^{-1}$ in % | 30 min 60° C. | >97 | 59 | 21 | <3 | <3 | <3 |
| | 30 min 70° C. | >97 | 31 | 10 | <3 | <3 | <3 |
| | 30 min 80° C. | >97 | 8 | <3 | <3 | <3 | <3 |

The invention claimed is:

1. An aqueous, curable composition, comprising
A) at least one uretdione prepolymer, which comprises at least one uretdione group, and which is obtainable by reacting
A1) at least one uretdione polyisocyanate having an isocyanate functionality of at least 2.0, whereby said uretdione polyisocyanate is obtained from at least one aliphatic polyisocyanate,
with
A2) at least one compound comprising at least one Zerewitinoff-active group, and
A3) at least one reactant, which comprises at least one Zerewitinoff-active group and being different from A2 or which is H$_2$O,
optionally in the presence of at least one catalyst, to obtain the uretdione prepolymer;
wherein the prepolymer has an acid number of at most 4 mg KOH/g, determined according to DIN EN ISO 2114:2002-06 as 37 wt. % aqueous dispersion; and
B) optionally, at least one compound, which comprises at least one Zerewitinoff-active group; and
C) at least one azolate-compound, with the proviso that the composition includes no Na-1,2,4-triazolate.

2. The aqueous, curable composition according to claim 1, characterized in that
in a first step, the at least one uretdione polyisocyanate A1 is reacted, optionally in the presence of a catalyst, with the at least one compound A2, wherein after the first step the resulting intermediate product has an isocyanate content of 0.5 to 10 wt.-%, measured according to DIN EN ISO 11909:2007-05;
and in a second step the polymer obtained in the first step is reacted with the at least one reactant A3.

3. The aqueous, curable composition according to claim 1, characterized in that
the components A1 to A3 are reacted in a one-step process, optionally in the presence of a catalyst.

4. The aqueous, curable composition according to claim 1, characterized in that
in a first step, the at least one uretdione polyisocyanate A1 is reacted with the at least one reactant A3 and in a second step the polymer obtained in the first step is reacted in a second step with the at least one compound A2, optionally in the presence of a catalyst.

5. The aqueous, curable composition according to claim 1, characterized in that said uretdione prepolymer is a nonionic prepolymer.

6. The aqueous, curable composition according to claim 1, characterized in that said uretdione prepolymer exhibits a zeta potential of at least −20 mV.

7. The aqueous, curable composition according to claim 1, characterized in that said uretdione prepolymer A comprises at least one *—O—$(CH_2CH_2O)_n$—R moiety, in which R is a hydrogen atom or a $(C_1$-$C_4)$-alkyl group and n is a number from 3 to 100.

8. The aqueous, curable composition according to claim 1, characterized in that said uretdione polyisocyanate A1 is obtained from at least one cycloaliphatic polyisocyanate.

9. The aqueous, curable composition according to claim 1, characterized in that said uretdione polyisocyanate A1 is obtained from isophorone diisocyanate (IPDI), 1,6-hexylene diisocyanate or mixtures thereof.

10. The aqueous, curable composition according to claim 1, characterized in that said uretdione polyisocyanate A1 is prepared from at least 20 mol % isophorone diisocyanate (IPDI) based on the total amount of polyisocyanates used.

11. The aqueous, curable composition according to claim 1, characterized in that said uretdione polyisocyanate A1 is prepared from isophorone diisocyanate as the only polyisocyanate used.

12. The aqueous, curable composition according to claim 1, characterized in that the uretdione polyisocyanate A1 contains from 1 to 10 uretdione moieties.

13. The aqueous, curable composition according to claim 1, characterized in that compound A2 is at least one polyol.

14. The aqueous, curable composition according to claim 1, characterized in that compound A3 is selected from at least one polyol which is different from A2 and selected from the group consisting of polyester polyols, polyether polyols, polyurethane polyols, polyacrylate polyols, polymethacrylate polyols, polycarbonate polyols, and mixtures thereof.

15. The aqueous, curable composition according to claim 1, characterized in that said compound A1 is used in an amount of 3.0 to 50.0 wt. % based on the total weight of compounds A1 to A3.

16. The aqueous, curable composition according to claim 1, characterized in that said compound A2 is used in amount of 50 to 97 wt.-% based on the total weight of compounds A1 to A3.

17. The aqueous, curable composition according to claim 1, characterized in that the weight ratio of A1 to A2 is from 1:1 to 1:32.3.

18. The aqueous, curable composition according to claim 1, characterized in that said uretdione prepolymer is a dispersed uretdione prepolymer.

19. The aqueous, curable composition according to claim 1, characterized in that said uretdione prepolymer A is contained in a total amount of 3 to 40 wt. % based on the total weight of the composition.

20. The aqueous, curable composition according to claim 1, characterized in that said at least one compound B, which comprises at least one Zerewitinoff-active group is selected from polyester polyols, polyether polyols, polyurethane polyols, polyacrylate polyols, polymethacrylate polyols, or polycarbonate polyols and mixtures thereof.

21. The aqueous, curable composition according to claim 1, characterized in that said uretdione prepolymer A is contained in an amount of 1 to 50 wt. % and
said at least one compound B, which comprises at least one Zerewitinoff-active group is contained in an amount of 0 to 80 wt.-% and
said triazolate-compound C is contained in an amount of 0.1 to 10 wt. %, based on the total weight of the composition, respectively.

22. The aqueous, curable composition according to claim 1, characterized in that the composition comprises water in an amount of 10 to 85 wt. %, based on the total weight of the composition.

23. The aqueous, curable composition according to claim 1, characterized in that the composition has a pH-value at 20° C. of from pH 5 to pH 13.

* * * * *